United States Patent
Panda et al.

(10) Patent No.: US 11,538,248 B2
(45) Date of Patent: Dec. 27, 2022

(54) SUMMARIZING VIDEOS VIA SIDE INFORMATION

(71) Applicant: International Business Machines Corporation, Armonk, NY (US)

(72) Inventors: Rameswar Panda, Medford, MA (US); Chuang Gan, Cambridge, MA (US); Pin-Yu Chen, White Plains, NY (US); Bo Wu, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/081,239

(22) Filed: Oct. 27, 2020

(65) Prior Publication Data

US 2022/0129679 A1 Apr. 28, 2022

(51) Int. Cl.
*G06V 20/00* (2022.01)
*G06V 20/40* (2022.01)
*G06F 16/783* (2019.01)
*G06N 20/00* (2019.01)

(52) U.S. Cl.
CPC .......... *G06V 20/47* (2022.01); *G06F 16/7844* (2019.01); *G06N 20/00* (2019.01); *G06V 20/49* (2022.01)

(58) Field of Classification Search
CPC .................................................. G06K 9/00751
See application file for complete search history.

(56) References Cited

U.S. PATENT DOCUMENTS

| | | | |
|---|---|---|---|
| 6,751,354 B2 | 6/2004 | Foote et al. | |
| 7,246,314 B2 | 7/2007 | Foote et al. | |
| 8,145,648 B2 | 3/2012 | Kunjithapatham et al. | |
| 9,646,652 B2 | 5/2017 | Adsumilli et al. | |
| 9,792,502 B2 | 10/2017 | Newman et al. | |
| 9,813,784 B1* | 11/2017 | Carlson | H04N 21/2668 |
| 2002/0028021 A1* | 3/2002 | Foote | G06K 9/00758 |
| | | | 382/224 |
| 2005/0254782 A1 | 11/2005 | Hsu | |
| 2016/0267179 A1* | 9/2016 | Mei | G06F 16/7834 |
| 2019/0035091 A1* | 1/2019 | Bi | H04N 5/247 |
| 2019/0244031 A1* | 8/2019 | Delachanal | G11B 27/10 |

OTHER PUBLICATIONS

Mell et al., "The NIST Definition of Cloud Computing," NIST Special Publication 800-145, Sep. 2011 (7 pages).

(Continued)

*Primary Examiner* — Daniel T Tekle
(74) *Attorney, Agent, or Firm* — Anthony Curro; Michael J. Chang, LLC

(57) ABSTRACT

Machine learning-based techniques for summarizing collections of data such as image and video data leveraging side information obtained from related (e.g., video) data are provided. In one aspect, a method for video summarization includes: obtaining related videos having content related to a target video; and creating a summary of the target video using information provided by the target video and side information provided by the related videos to select portions of the target video to include in the summary. The side information can include video data, still image data, text, comments, natural language descriptions, and combinations thereof.

18 Claims, 5 Drawing Sheets

(56) References Cited

OTHER PUBLICATIONS

Shechtman et al., "Matching Local Self-Similarities across Images and Videos," 2007 IEEE Conference on Computer Vision and Pattern Recognition, Minneapolis, MN (Jun. 2007) (8 pages).
Yousefi et al., "Selective Keyframe Summarisation for Egocentric Videos Based on Semantic Concept Search," 2018 IEEE International Conference on Image Processing, Applications and systems (IPAS), Sophia Antipolis, France (Jan. 2018) (7 pages).
Ludmila I. Kuncheva et al., "Edited Nearest Neighbour for Selecting Keyframe Summaries of Egocentric Videos," Journal of Visual Communication and Image Representation, vol. 52, Academic Press, Elsevier Science (Apr. 2018) (16 pages).
Mademlis I. et al., "Summarization of Human Activity Videos Using a Salient Dictionary," 2017 IEEE International Conference on Image Processing (ICIP), Beijing, 2017 (Sep. 2017) (6 pages).
Ma et al., "Video summarization via block sparse dictionary selection," Neurocomputing, vol. 378, pp. 197-209, Feb. 2020 (published Oct. 2019).
Wu et al., "Dynamic Graph Convolutional Network for Multi-Video Summarization," Pattern Recognition, vol. 107 (Jun. 2020) 107382 (13 pages).
Wang et al., "Modality correlation-based video summarization," Multimedia Tools and Applications (Mar. 2020) (16 pages).
Rochan et al., "Video Summarization Using Fully Convolutional Sequence Networks," In Proceedings of the European Conference on Computer Vision (ECCV) (Oct. 2018) (17 pages).
Potapov et al., "Category-Specific Video Summarization," In European Conference on Computer Vision (ECCV) (Sep. 2014) (16 pages).
Truong et al., "Video Abstraction: A Systematic Review and Classification," ACM Transactions on Multimedia Computing, Communications, and Applications (TOMM), vol. 3, No. 1, Article 3 (Feb. 2007) (37 pages).
Sandra Eliza Fontes de Avila et al., "VSUMM: A mechanism designed to produce static video summaries and a novel evaluation method," Pattern Recognition Letters, vol. 32, issue 1, pp. 56-68 (Jan. 2011).
Zhang et al., "Summary transfer: Exemplar-based Subset Selection for Video Summarization," arXiv:1603.03369v1 (Mar. 2016) (10 pages).
Mundur et al., "Keyfiame-based Video Summarization using Delaunay Clustering," International Journal on Digital Libraries, 6(2) (Apr. 2006) (29 pages).
Yuan et al., "Video Summarization by Learning Deep Side Semantic Embedding," IEEE Transactions on Circuits and Systems for Video Technology, 29(1) (Jan. 2019) (12 pages).
E. Elhamifar et al., "See All by Looking at a Few: Sparse Modeling for Finding Representative Objects," 2012 IEEE Conference on Computer Vision and Pattern Recognition (Jun. 2012) (8 pages).
S. Pfeiffer et al., "Abstracting digital movies automatically," Tech. Rep., University of Manheim (1996) (16 pages).
Huang et al., "A Robust Scene-Change Detection Method for Video Segmentation," IEEE Transactions on Circuits and Systems For Video Technology, vol. 11, No. 12, pp. 1281-1288 (Dec. 2001).
Pigou et al., "Beyond Temporal Pooling: Recurrence and Temporal Convolutions for Gesture Recognition in Video," arXiv:1506.01911v3 (Feb. 2016) (13 pages).
Wang et al., "Temporal Pyramid Pooling Based Convolutional Neural Network for Action Recognition," arXiv:1503.01224v2 (Apr. 2015) (8 pages).

* cited by examiner

SUMMARIZING VIDEOS VIA SIDE INFORMATION

FIELD OF THE INVENTION

The present invention relates to data summarization, and more particularly, to machine learning-based techniques for summarizing collections of data such as image and video data leveraging side information obtained from related data.

BACKGROUND OF THE INVENTION

The goal of dimensionality reduction is to find compact representations of data that can save memory and computational time. For instance, dimensionality reduction of a dataset can involve finding a subset of the data that appropriately represents the whole dataset. See, for example, E. Elhamifar et al., "See All by Looking at a Few: Sparse Modeling for Finding Representative Objects," 2012 IEEE Conference on Computer Vision and Pattern Recognition (June 2012) (8 pages).

In the context of finding compact representations of images such as video data, video summarization is the process by which a short video summary of a video is automatically generated to enable faster browsing of large video collections, as well as more efficient content indexing and access. See, for example, Sandra Eliza Fontes de Avila et al., "VSUMM: A mechanism designed to produce static video summaries and a novel evaluation method," Pattern Recognition Letters, vol. 32, issue 1, pp. 56-68 (January 2011). Generally, a video summary is a sequence of still or moving pictures presenting the content of a video in such a way that the respective target group is rapidly provided with concise information about the content, while the essential message of the original video is preserved. See, e.g., S. Pfeiffer et al., "Abstracting digital movies automatically," Tech. Rep., University of Manheim (1996) (16 pages).

However, with conventional video summarization processes a video summary is typically extracted from a video independently, considering only the data contained in the video itself. As a result, the summarization process uses only a limited knowledge base, and thus the extracted summary does not always provide the best representations of the original video content.

Therefore, techniques for improving video summary representations would be desirable.

SUMMARY OF THE INVENTION

The present invention provides machine learning-based techniques for summarizing collections of data such as image and video data leveraging side information obtained from related (e.g., video) data. In one aspect of the invention, a method for video summarization is provided. The method includes: obtaining related videos having content related to a target video; and creating a summary of the target video using information provided by the target video and side information provided by the related videos to select portions of the target video to include in the summary. The side information can include video data, still image data, text, comments, natural language descriptions, and combinations thereof.

The target video and the related videos can be segmented (e.g., into multiple non-uniform segments) and the segments represented by feature vectors. For instance, the target video and each of the related videos can be divided into the multiple non-uniform segments by measuring an amount of change between two consecutive frames, and identifying a frame having a portion of total change that is greater than a predetermined threshold as a segment boundary. Representing the segments by the feature vectors can be performed using temporal average pooling within each of the segments using a fixed number of input frames.

The segments can then be scored using the feature vectors to obtain an importance score of each of the segments in the target video. A consensus estimation of the scored segments is performed to obtain a unified set of the segments, and the summary of the target video of a certain length is generated from the unified set of the segments. The summary of the target video can have a predetermined length based, for example, on a user length request from the unified set of the segments.

A more complete understanding of the present invention, as well as further features and advantages of the present invention, will be obtained by reference to the following detailed description and drawings.

DETAILED DESCRIPTION OF PREFERRED EMBODIMENTS

Figure 1:
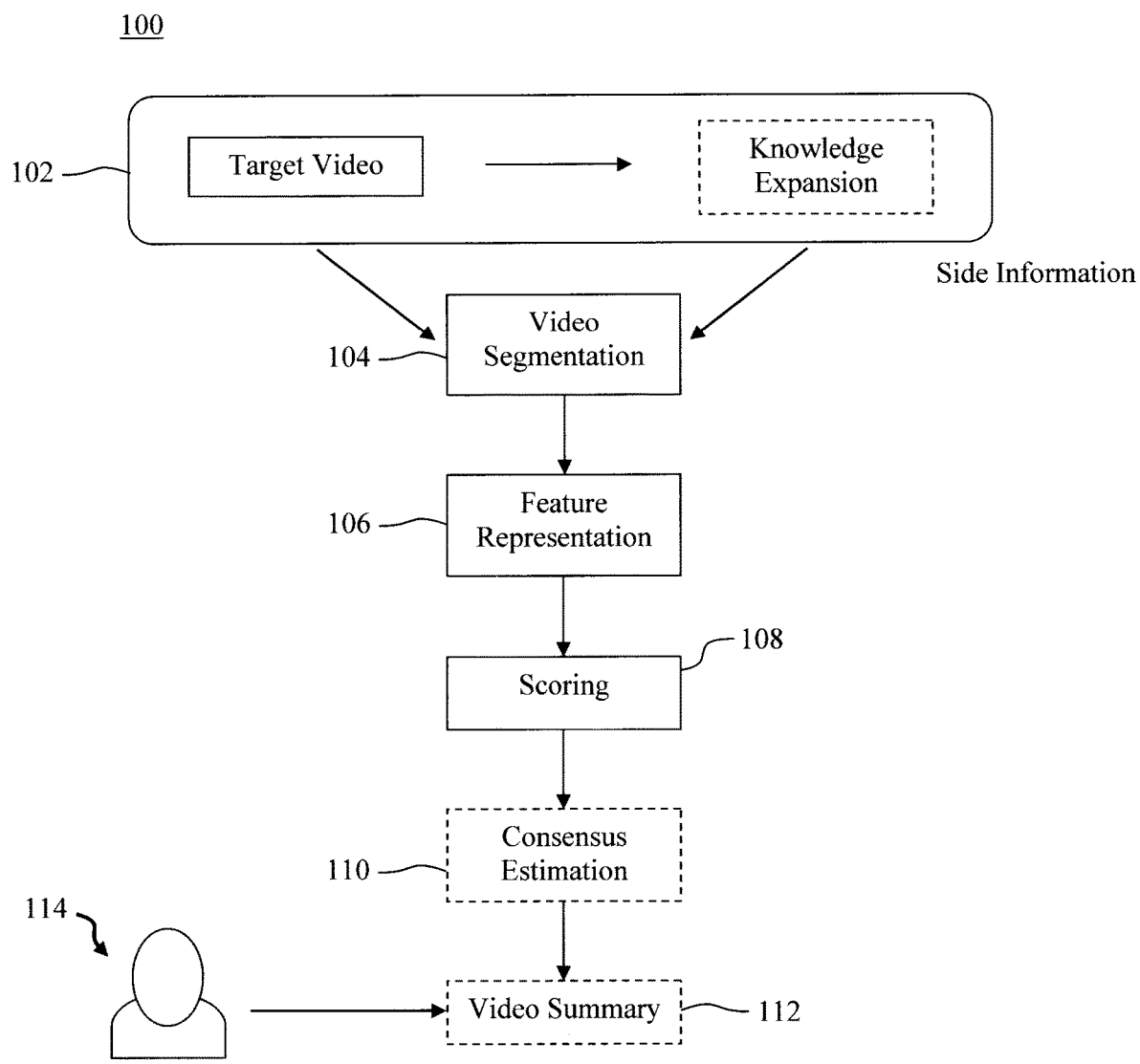
FIG. 1 is a diagram illustrating an exemplary methodology for video summarization according to an embodiment of the present invention.

As provided above, a video summary is a sequence of still or moving pictures presenting the content of a video in such a way that the respective target group is rapidly provided with concise information about the content, while the essential message of the original video is preserved. Conventional summarization processes typically extract video summaries from a video independently, considering only the data contained within the video itself. To look at it another way, conventional processes ignore the relationships that exist across different videos. Doing so, however, provides only a limited knowledge base. As a result, the extracted summary does not always provide the best representation of the original video content.

Advantageously, provided herein are data summarization techniques that expand the knowledge base by leveraging useful information from other related datasets to assist in the summarization process. This information gleaned from related datasets is also referred to herein as 'side information.' For instance, as will be described in detail below, in the context of video summarization the present techniques collect videos related to a target video and use side information from those related videos to assist in producing a video summary of the target video. By leveraging this side information, the result is the generation of a more informative summary.

The notion is that this side information from related videos provides a visual context to identify what is important in a target video. Namely, there exists relationships across different videos, images, text data that are freely available on the Internet or elsewhere while summarizing a given video. This side information provides additional knowledge, i.e., in addition to the information provided in the target video itself, to extract a high-quality informative summary from a given target video.

As will be described in detail below, according to an exemplary embodiment the extracted summary of the target video will be created using both information provided by the target video and the side information provided by the related videos to select portions (e.g., segments—see below) of the target video to include in the summary. Namely, the side information from the related videos is leveraged to find the most important segments from the target video to be included in the video summary, i.e., the extracted summary simultaneously covers the important particularities arising in the target video, as well as the generalities arising in the collection of related videos. However, it is notable that only portions/segments of the target video are included in the video summary. Further, as will be described in detail below, a consensus estimation is performed on scored segments of the target video and related videos. The goal of this consensus estimation is to merge information from both the target video and the related videos such that the information provided by the target video and the side information provided by the related videos are agreeing on the same video summary. Advantageously, the present techniques can also be easily applied to handle side information obtained from data modalities other than video such as still images, text, comments and/or natural language descriptions that are often available along with the specified video.

Given the above overview, FIG. 1 is a diagram illustrating an exemplary methodology 100 for video summarization. The process begins with a digital target video for which the generation of a video summary is desired. The video summary will be shorter in length than the target video, and will provide viewers with a representative summary of the content of the target video. To use an illustrative, non-limiting example, a two-minute video summary can be generated to summarize the content of a two-hour target video. As highlighted above, and as will be described in detail below, side information from an expanded knowledge base will be levered to extract a high-quality informative summary from the target video.

In step 102, a search is conducted for digital videos with content related to the target video (also referred to herein as 'related videos') to obtain a set of related videos. The related videos can be thought of as belonging to the same category of content or topic as the target video. For instance, to use a simple, non-limiting example as an illustration, if the target video is related to surfboarding (related content), then the related videos are also related to surfboarding. According to an exemplary embodiment, videos generated from a keyword search using an Internet search engine are considered as related in accordance with the present techniques, e.g., videos shown with keyword "Times Square in NYC" are related to each other.

In general, the related videos can be found in any searchable database or other repository of video data. According to an exemplary embodiment, an online search is conducted in step 102. For instance, in one exemplary embodiment an online search engine is provided with key words related to the content of the target video to search for videos on the Internet. The results returned by the search engine serve as the collection of related videos obtained in step 102. By way of example only, the key words used to search for related videos may be provided by a user knowledgeable about the content of the target video.

The side information contained in the related videos obtained in step 102 serves to expand the knowledge base leveraged for the summarization process, i.e., beyond the information provided by the target video itself. This is an important distinction from conventional processes which typically extract video summaries from a video independently, ignoring the relationships that exist across different videos. With an expanded knowledge base, the present techniques are advantageously able to generate a higher-quality (i.e., better representative) summary of the target video. The notion here is that, since the related videos have content related to the original target video, then there will be information of common interest in the target and related videos. To look at it another way, information (i.e., side information) that is interesting in the target video will also be interesting in the related videos. The contribution of this side information from the expanded knowledge base is depicted graphically in FIG. 1 using dashed lines.

To extract information from the target video and side information from the related videos, in step 104 the target video and each of the related videos are segmented into multiple segments. A 'frame' is one of the still images that makes up a 'moving' video. Each of the segments will include multiple frames. According to an exemplary embodiment, step 104 includes dividing the target and each related video into multiple non-uniform segments at segment boundaries by measuring the amount of change between two consecutive frames. By 'non-uniform' it is meant that each segment can include a different number of frames from the other segments. By way of example only, in one embodiment, the target and each related video are divided into multiple non-uniform segments by measuring the amount of change between two consecutive frames in RGB color space (Red, Green, Blue). Specifically, the amount of change refers to the difference of pixel intensity between consecutive frames along the three color RGB space.

A segment boundary is identified as a frame having a portion of total change that is greater than a predetermined threshold. By way of example only, in one embodiment, a segment boundary is determined at a certain frame when the portion of total change is greater than 80% (predetermined threshold). More specifically, if the amount of change between two consecutive frames is more than 80%, then that is indicative of a segment boundary. The notion here is that change between frames can be indicative of a scene change in the video content. Thus, segmenting the videos in this manner enables isolation of different scenes in the video, some of which may be relevant to the video summary. By way of example only, change in video frames can be detected by monitoring intensity and motion information. See, for example, Huang et al., "A Robust Scene-Change Detection Method for Video Segmentation," IEEE Transactions on Circuits and Systems For Video Technology, vol. 11, no. 12, pp. 1281-1288 (December 2001).

In step 106, each of the segments is represented by a feature vector. According to an exemplary embodiment, three-dimensional (3D) convolutional neural network features are extracted by taking a fixed number of input frames at a time, and then adopting a temporal average pooling scheme within each of the segments. Average pooling for temporal data is a technique used to capture temporal structure in videos. Pigou et al., "Beyond Temporal Pooling: Recurrence and Temporal Convolutions for Gesture Recognition in Video," arXiv:1506.01911v3 (February 2016) (13 pages). However, many convolutional neural network models are typically designed to work with single image input. See, for example, Wang et al., "Temporal Pyramid Pooling Based Convolutional Neural Network for Action Recognition," arXiv:1503.01224v2 (April 2015) (8 pages). These models can be adapted to the video segments which have a varying number of frames (see above) by using a fixed number of input frames. For instance, in one non-limiting example, 16 input frames are taken at a time. The pooling result serves as the final feature vector of a video segment to be used for extracting a video summary.

In machine learning and cognitive science, convolutional neural networks are a family of statistical learning models inspired by the biological neural networks of animals, and in particular the brain. Convolutional neural networks may be used to estimate or approximate systems and cognitive functions that depend on a large number of inputs and weights of the connections which are generally unknown.

Figure 2:
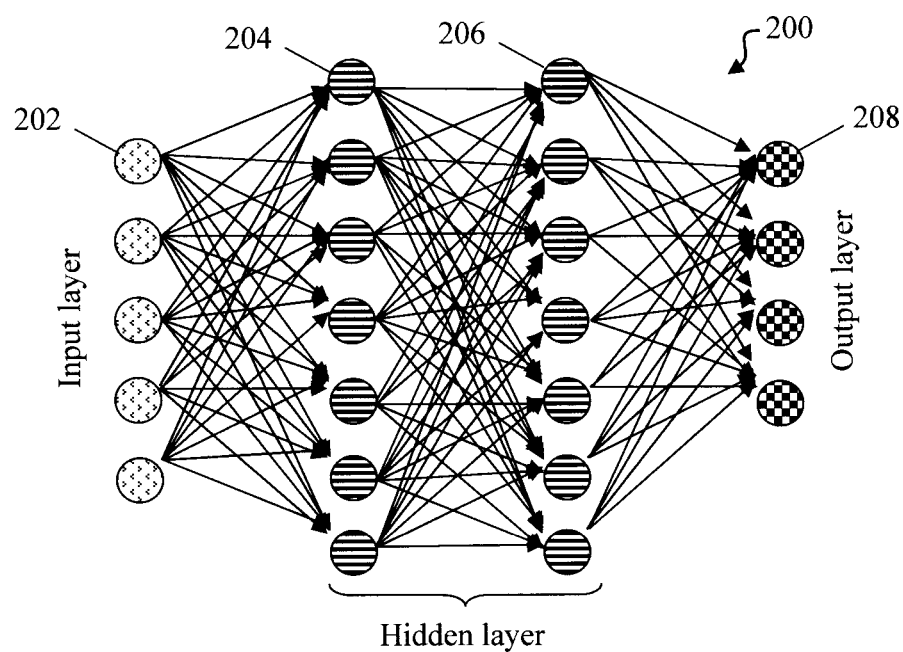
FIG. 2 is a schematic diagram illustrating an exemplary convolutional neural network according to an embodiment of the present invention.

Convolutional neural networks are often embodied as so-called "neuromorphic" systems of interconnected processor elements that act as simulated "neurons" that exchange "messages" between each other in the form of electronic signals. See, for example, FIG. 2 which provides a schematic illustration of an exemplary convolutional neural network 200. As shown in FIG. 2, convolutional neural network 200 includes a plurality of interconnected processor elements 202, 204/206 and 208 that form an input layer, at least one hidden layer, and an output layer, respectively, of the convolutional neural network 200. By way of example only, convolutional neural network 200 can be embodied in an analog cross-point array of resistive devices such as resistive processing units (RPUs).

Similar to the so-called 'plasticity' of synaptic neurotransmitter connections that carry messages between biological neurons, the connections in a convolutional neural network that carry electronic messages between simulated neurons are provided with numeric weights that correspond to the strength or weakness of a given connection. The weights can be adjusted and tuned based on experience, making convolutional neural networks adaptive to inputs and capable of learning. For example, a convolutional neural network for image classification is defined by a set of input neurons (see, e.g., input layer 202 in deep neural network 200) which may be activated by the pixels of an input image. After being weighted and transformed by a function determined by the network's designer, the activations of these input neurons are then passed to other downstream neurons, which are often referred to as 'hidden' neurons (see, e.g., hidden layers 204 and 206 in deep neural network 200). This process is repeated until an output neuron is activated (see, e.g., output layer 208 in convolutional neural network 200). The activated output neuron makes a class decision.

Instead of utilizing the traditional digital model of manipulating zeros and ones, convolutional neural networks such as convolutional neural network 200 create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Referring back to methodology 100 of FIG. 1, in step 108 each of the video segments is scored using the feature vectors. For instance, let v be the target video that is to be summarized and v denote the set of related videos collected, e.g., from the Internet, as side information (e.g., videos belonging to the same category—see above). Let the feature matrix of the target video v and the feature matrix of the set of related videos $\tilde{v}$ be given by Y and $\tilde{Y}$, respectively. Namely, once a feature vector is generated (see step 106— described above), a video is represented by a feature matric (which is just a concatenation of the feature vectors) which is then used for segment scoring. Thus, feature matrix Y and feature matrix Y are simply concatenations of the feature vectors generated in the previous step 106. n represents a total number of segments in the target video v, and ñ represents the total number of segments in the set of the related videos $\tilde{v}$. According to an exemplary embodiment, the importance score of each segment in the target video v is obtained by solving the following objective function over the feature matrices Y and $\tilde{Y}$ by, $$\min_{C,\tilde{C}} \|Y - YC\|_F^2 + \|\tilde{Y} - Y\tilde{C}\|_F^2 + \alpha(\|C\|_{1,2} + \|\tilde{C}\|_{1,2}) \qquad (1)$$

wherein $C \in R^{n \times n}$ and $\tilde{C} \in R^{n \times \tilde{n}}$ are score matrices and $\|C\|_{1,2} = \Sigma_{i=2}^{n} \|C_i\|_2$. $\|C_i\|_2$ is an $l_2$ norm of an i-th row of C and indicates the importance score of an i-th video segment. $\alpha$ is a regularization parameter. Once the objective function is solved, two different score matrices independently represent different scores with respect to the target video and related videos. Specifically, the rows in score matrix C provide information on the importance of each segment in describing the feature matrix Y of video v, while rows in score matrix $\tilde{C}$ give information on importance of each segment in feature matrix Y in describing $\tilde{Y}$. In other words, the above formulation summarizes a video neglecting possible relationships that possibly reside across the videos. However, in order to obtain a single set of representative segments from the target video, both of the score matrices need to be combined such that important events in the target video and the side information in the related videos are well captured. As highlighted above, only segments from the target video are included in the video summary. In other words, a viewer of the video summary will not see content from the related videos. However, the side information from the related videos helps to find the most important segments from the target video to use in the video summary.

The factors of representativeness and sparsity are part of the video segment scoring process. The overall idea of representativeness is that the video segments selected for the video summary should be representative of the whole video. On the other hand, the sparsity indicates that the number of selected segments should be small compared to the total number of video segments presented in a video. For example, in Equation 1 above, the first two terms, i.e., $\|Y-YC\|_F^2$ and $\|\tilde{Y}-Y\tilde{C}\|_F^2$, represent representativeness in the segment scoring, and the last two terms, i.e., $\|C\|_{1,2}$ and $\|\tilde{C}\|_{1,2}$, represent the sparsity in video summarization.

In step 110, a consensus estimation of the segments that have been scored is performed to obtain a unified set of the segments. As provided above, the goal of this consensus estimation is to merge information from both the target video and the related videos such that the information provided by the target video and the side information provided by the related videos are agreeing on the same video summary. According to an exemplary embodiment, step 110 is carried out by combining both of the score matrices from step 108 generated from both the target video and the related videos, i.e., $C \in R^{n \times n}$ and $\tilde{C} \in R^{n \times \tilde{n}}$ through a unified objective function as:

$$\min_{Y,\tilde{Y}} \|Y - YC\|_F^2 + \|\tilde{Y} - Y\tilde{C}\|_F^2 + \alpha(\|C\|_{1,2} + \|\tilde{C}\|_{1,2}) + \beta\|C_C\|_{1,2}, \quad (2)$$

wherein $C_C = [C | \tilde{C}]$ is a row-wise concatenation of the two individual score matrices $C \in R^{n \times n}$ and $\tilde{C} \in R^{n \times \tilde{n}}$. $\|C_C\|_{1,2}$ represents a consensus score matrix that enables $C$ and $\tilde{C}$ to share common components that occur collectively in the target video and related video collection. Thus, the consensus function in Equation 2 combines the score matrices generated from both the target video and the related videos. It is notable that the shared knowledge of the two matrices can be enhanced by suppressing irrelevant or noisy video segments. Namely, the present approach suppresses noisy video segments to not be part of the video summary by leveraging the side information from the related videos. For instance, if a certain event is only present in the target video but is not related to the topic/category of the target video, then it will not be part of the video summary. To use a simple, non-limiting example to illustrate this concept, suppose the target video is related to surfboarding, and there exist some segments of the target video regarding "two people talking to each other," these segments are irrelevant and hence should not be part of the video summary. Since the "two people talking to each other" segments will not be present in other related videos of surfboarding, the present approach will eventually discard these irrelevant segments after the consensus estimation is performed.

In step 112, a video summary of the target video is generated from the unified set of segments. As provided above, only segments from the target video are included in the video summary. In other words, a viewer of the video summary will not see content from the related videos. Thus, in step 112, only the segments from the target video are used to generate the video summary. According to an exemplary embodiment, once the consensus estimation problem is solved (see step 110 above), the video summary is generated by first sorting the segments in the unified set of segments by decreasing importance according to the $l_2$ norm of the rows in matrix $C_C$, and then constructing the optimal summary of a certain length from the top-ranked segments. According to an exemplary embodiment, the video summary is generated having a predetermined length. By way of example only, as shown in FIG. 1 the predetermined length can be based on a length request from a user(s) 114 (also referred to herein as a 'user length request').

As will be described below, one or more elements of the present techniques can optionally be provided as a service in a cloud environment. For instance, by way of example only, the related videos can also reside remotely on a cloud server. Also, the target and related videos segmentation, the feature vector representation, segment scoring, consensus estimation and/or summary generation can be performed on a dedicated cloud server to take advantage of high-powered CPUs and GPUs, after which the result is sent back to the local device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
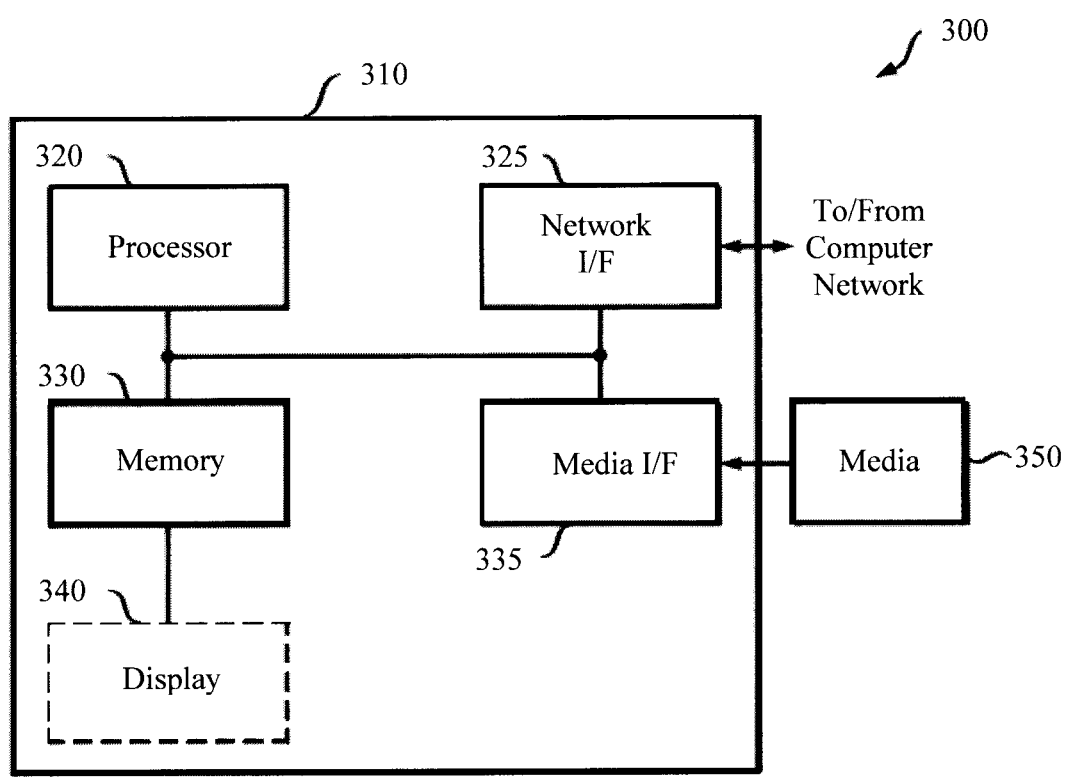
FIG. 3 is a diagram illustrating an exemplary apparatus for performing one or more of the methodologies presented herein according to an embodiment of the present invention.

Turning now to FIG. 3, a block diagram is shown of an apparatus 300 for implementing one or more of the methodologies presented herein. By way of example only, apparatus 300 can be configured to implement one or more of the steps of methodology 100 of FIG. 1.

Apparatus 300 includes a computer system 310 and removable media 350. Computer system 310 includes a processor device 320, a network interface 325, a memory 330, a media interface 335 and an optional display 340. Network interface 325 allows computer system 310 to connect to a network, while media interface 335 allows computer system 310 to interact with media, such as a hard drive or removable media 350.

Processor device 320 can be configured to implement the methods, steps, and functions disclosed herein. The memory 330 could be distributed or local and the processor device 320 could be distributed or singular. The memory 330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 320. With this definition, information on a network, accessible through network interface 325, is still within memory 330 because the processor device 320 can retrieve the information from the network. It should be noted that each distributed processor that makes up processor device 320 generally contains its own addressable memory space. It should also be noted that some or all of computer system 310 can be incorporated into an application-specific or general-use integrated circuit.

Optional display 340 is any type of display suitable for interacting with a human user of apparatus 300. Generally, display 340 is a computer monitor or other similar display.

Figure 4:
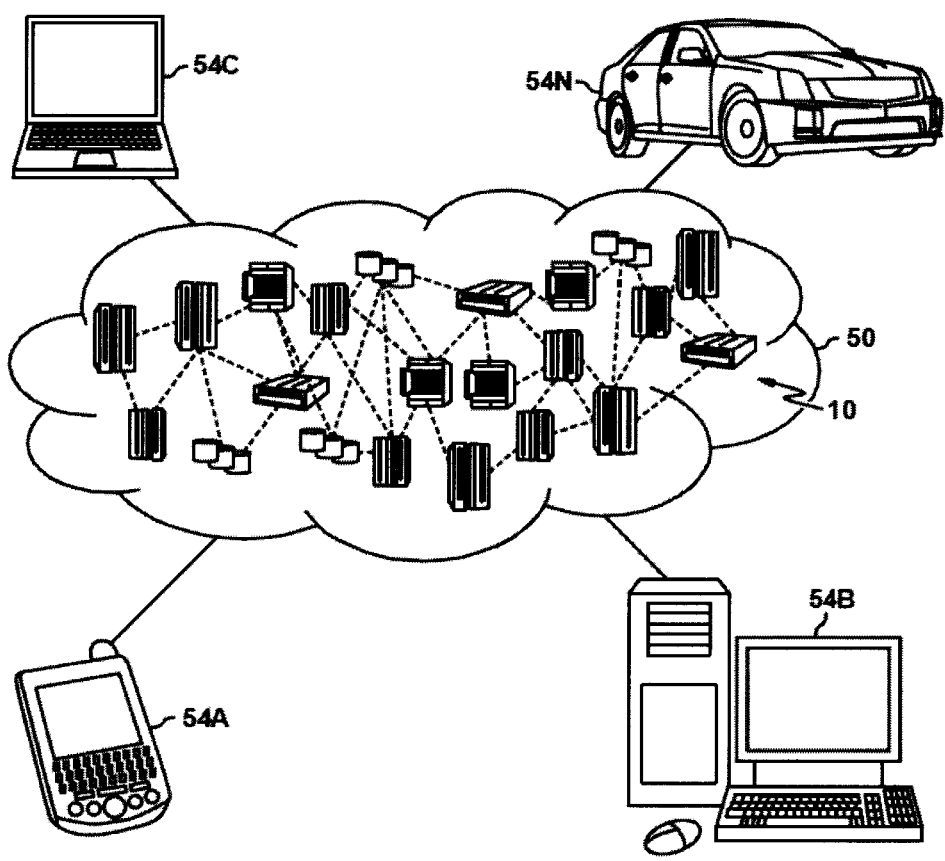
FIG. 4 depicts a cloud computing environment according to an embodiment of the present invention.
Figure 5:
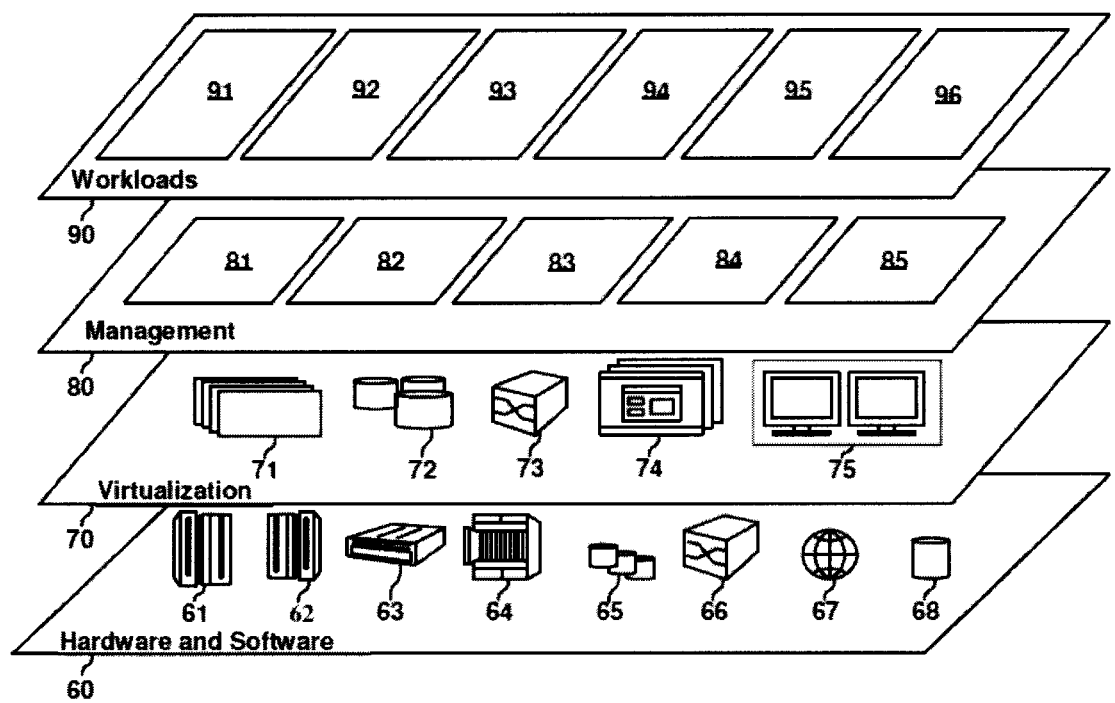
FIG. 5 depicts abstraction model layers according to an embodiment of the present invention.

Referring to FIG. 4 and FIG. 5, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video summarization 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for video summarization, comprising:
   obtaining related videos which, while being different videos from a target video, have content related to the target video; and
   creating a summary of the target video using information provided by the target video and side information provided by the related videos to select which portions of the target video to use in creating the summary of the target video, wherein only the portions of the target video are included in the summary of the target video, and wherein the information provided by the target video and the side information provided by the related videos are used to create the summary of the target video by performing a consensus estimation on scored segments of the target video and the related videos such that, based on the consensus estimation, irrelevant segments of the target video are excluded from the summary of the target video.

2. The method of claim 1, further comprising:
   searching for the related videos online.

3. The method of claim 1, wherein the side information comprises video data, still image data, text, comments, natural language descriptions, and combinations thereof.

4. The method of claim 1, further comprising:
   segmenting the target video and the related videos into segments;
   representing the segments by feature vectors, wherein the feature vectors comprise three-dimensional convolutional neural network features extracted by performing temporal average pooling within each of the segments using a fixed number of input frames;
   scoring the segments using the feature vectors to provide the scored segments of the target video and the related videos;
   performing the consensus estimation of the scored segments of the target video and the related videos to obtain a unified set of the segments; and
   generating the summary of the target video of a certain length from the unified set of the segments.

5. The method of claim 4, wherein the target video and the related videos are segmented into multiple non-uniform segments.

6. The method of claim 5, wherein the segmenting of the target video and the related videos into the segments comprises:
   dividing the target video and each of the related videos into the multiple non-uniform segments by measuring an amount of change between two consecutive frames, and identifying a frame having a portion of total change that is greater than a predetermined threshold as a segment boundary.

7. The method of claim 4, wherein v is the target video and $\tilde{v}$ is a set of the related videos, wherein Y is a feature matrix of the target video v and $\tilde{Y}$ is a feature matrix of the set of related videos, wherein n represents a total number of segments in the target video v and $\tilde{n}$ represents a total number of segments in the set of the related videos $\tilde{v}$, and wherein the scoring of the segments using the feature vectors comprises:
   obtaining an importance score of each of the segments in the target video v by solving, $$\min_{C,\tilde{C}} \|Y - YC\|_F^2 + \|\tilde{Y} - Y\tilde{C}\|_F^2 + \alpha(\|C\|_{1,2} + \|\tilde{C}\|_{1,2})$$

over the feature matrix Y and the feature matrix $\tilde{Y}$, wherein $C \in \mathbb{R}^{n \times n}$ and $\tilde{C} \in \mathbb{R}^{n \times \tilde{n}}$ are score matrices and $\|C\|_{1,2} = \Sigma_{i=2}^{n} \|C_i\|_2$, $\|C_i\|_2$ is an $I_2$ norm of an i-th row of C and indicates the importance score of an i-th video segment, and wherein $\alpha$ is a regularization parameter.

8. The method of claim 7, wherein the performing of the consensus estimation comprises:
   combining the score matrices $C \in \mathbb{R}^{n \times n}$ and $\tilde{C} \in \mathbb{R}^{n \times \tilde{n}}$ through a unified objective function as:

$$\min_{Y,\tilde{Y}} \|Y - YC\|_F^2 + \|\tilde{Y} - Y\tilde{C}\|_F^2 + \alpha(\|C\|_{1,2} + \|\tilde{C}\|_{1,2}) + \beta\|C_C\|_{1,2},$$

wherein $C_C = [C|\tilde{C}]$ is a row-wise concatenation of the two individual score matrices $C \in \mathbb{R}^{n \times n}$ and $\tilde{C} \in \mathbb{R}^{n \times \tilde{n}}$, and wherein $\|C_C\|_{1,2}$ represents a consensus score matrix that enables C and $\tilde{C}$ to share common components that occur collectively in the target video and the related videos.

9. The method of claim 4, wherein the summary of the target video is generated having a predetermined length.

10. The method of claim 9, wherein the predetermined length is based on a user length request.

11. A non-transitory computer program product for video summarization, the computer program product comprising a computer readable storage medium having program instructions embodied therewith, the program instructions executable by a computer to cause the computer to:
   obtain related videos which, while being different videos from a target video, have content related to the target video; and
   create a summary of the target video using information provided by the target video and side information provided by the related videos to select which portions of the target video to use in creating the summary of the target video, wherein only the portions of the target video are included in the summary of the target video, and wherein the information provided by the target video and the side information provided by the related videos are used to create the summary of the target video by performing a consensus estimation on scored segments of the target video and the related videos such that, based on the consensus estimation, irrelevant segments of the target video are excluded from the summary of the target video.

12. The non-transitory computer program product of claim 11, wherein the side information comprises video data, still image data, text, comments, natural language descriptions, and combinations thereof.

13. The non-transitory computer program product of claim 11, wherein the program instructions further cause the computer to:

segment the target video and the related videos into segments;

represent the segments by feature vectors, wherein the feature vectors comprise three-dimensional convolutional neural network features extracted by performing temporal average pooling within each of the segments using a fixed number of input frames;

score the segments using the feature vectors to provide the scored segments of the target video and the related videos;

perform the consensus estimation of the scored segments of the target video and the related videos to obtain a unified set of the segments; and generate the summary of the target video of a certain length from the unified set of the segments.

14. The non-transitory computer program product of claim 13, wherein the target video and the related videos are segmented into multiple non-uniform segments.

15. The non-transitory computer program product of claim 14, wherein to segment the target video and the related videos into the segments, the program instructions further cause the computer to:

divide the target video and each of the related videos into the multiple non-uniform segments by measuring an amount of change between two consecutive frames, and identifying a frame having a portion of total change that is greater than a predetermined threshold as a segment boundary.

16. The non-transitory computer program product of claim 14, wherein v is the target video and $\tilde{v}$ is a set of the related videos, wherein Y is a feature matrix of the target video v and $\tilde{Y}$ is a feature matrix of the set of related videos, wherein n represents a total number of segments in the target video $\tilde{v}$ and n represents a total number of segments in the set of the related videos $\tilde{v}$, and wherein to score the segments using the feature vectors the program instructions further cause the computer to:

obtain an importance score of each of the segments in the target video v by solving, $$\min_{C,\tilde{C}} \|Y - YC\|_F^2 + \|\tilde{Y} - Y\tilde{C}\|_F^2 + \alpha(\|C\|_{1,2} + \|\tilde{C}\|_{1,2})$$

over the feature matrix Y and the feature matrix $\tilde{Y}$, wherein $C \in \mathbb{R}^{n \times n}$ and $\tilde{C} \in \mathbb{R}^{n \times \tilde{n}}$ are score matrices and $\|C\|_{1,2} = \Sigma_{i=2}^{n} \|C_i\|_2$, $\|C_i\|_2$ is an $I_2$ norm of an i-th row of C and indicates the importance score of an i-th video segment, and wherein $\alpha$ is a regularization parameter.

17. The non-transitory computer program product of claim 16, wherein to perform the consensus estimation, the program instructions further cause the computer to:

combine the score matrices $C \in \mathbb{R}^{n \times n}$ and $\tilde{C} \in \mathbb{R}^{n \times \tilde{n}}$ through a unified objective function as:

$$\min_{Y,\tilde{Y}} \|Y - YC\|_F^2 + \|\tilde{Y} - Y\tilde{C}\|_F^2 + \alpha(\|C\|_{1,2} + \|\tilde{C}\|_{1,2}) + \beta\|C_C\|_{1,2},$$

wherein $C_C = [C|\tilde{C}]$ is a row-wise concatenation of the score matrices $C \in \mathbb{R}^{n \times n}$ and $\tilde{C} \in \mathbb{R}^{n \times \tilde{n}}$, and wherein $\|C\|_{1,2}$ represents a consensus score matrix that enables C and $\tilde{C}$ to share common components that occur collectively in the target video and the related videos.

18. The non-transitory computer program product of claim 13, wherein the summary of the target video is generated having a predetermined length based on a user length request.

* * * * *